United States Patent [19]

Stone

[11] Patent Number: 4,851,260

[45] Date of Patent: Jul. 25, 1989

[54] PROCESS FOR PRODUCING A PENETRATIVE ASPHALTIC BINDER AND APPLYING THE BINDER TO A GRANULAR MATERIAL

[76] Inventor: Eugene M. Stone, 1105 Glencoe St., Denver, Colo. 80220

[21] Appl. No.: 219,376

[22] Filed: Jul. 15, 1988

Related U.S. Application Data

[63] Continuation-in-part of Ser. No. 56,667, Jun. 2, 1987, Pat. No. 4,777,064.

[51] Int. Cl.⁴ .............................. B05D 5/10; E01C 5/12
[52] U.S. Cl. .................................... 427/138; 106/281.1;
106/273.1; 208/23; 404/75; 427/372.2
[58] Field of Search .................. 427/138, 372.2; 106/276, 277, 281.1, 273 R; 208/22, 23; 404/75, 76, 77

[56] References Cited

U.S. PATENT DOCUMENTS

| | | | |
|---|---|---|---|
| 2,308,245 | 1/1943 | Ortynsky | 208/23 |
| 2,658,026 | 11/1953 | MacLaren et al. | 208/23 |
| 3,216,336 | 11/1965 | Benson | 427/138 |
| 3,399,608 | 9/1968 | Benson | 404/76 |
| 3,418,249 | 12/1968 | Pitchford | 208/23 |
| 3,793,189 | 2/1974 | Corbett | 208/22 |
| 3,919,148 | 11/1975 | Winters et al. | 427/138 |
| 3,986,887 | 10/1976 | Pitchford | 106/276 |
| 4,268,318 | 5/1981 | Stone | 106/277 |
| 4,283,230 | 8/1981 | Clementoni et al. | 427/138 |
| 4,283,231 | 8/1981 | Clementoni et al. | 427/138 |
| 4,373,961 | 2/1983 | Stone | 106/281.1 |

*Primary Examiner*—Sadie Childs
*Attorney, Agent, or Firm*—Cushman, Darby & Cushman

[57] ABSTRACT

A method of producing a penetrative binder product for stabilizing absorptive granular material. The binder product comprising a combination of resin asphaltene residuum, paving grade asphalt, and a non-evaporative diluent to yield a penetrative binder which neither pollutes the air or loses significant viscosity during application to the absorptive granular material to be stabilized, the diluent further acting to inhibit the capillary movement of moisture in material underlying the originally penetrated depth.

15 Claims, No Drawings

PROCESS FOR PRODUCING A PENETRATIVE ASPHALTIC BINDER AND APPLYING THE BINDER TO A GRANULAR MATERIAL

This application is a continuation-in-part of application Ser. No. 056,667 filed June 2, 1987, entitled Method of Reducing Penetration of Paving Grade Asphalts, now U.S. Pat. No. 4,777,064, the disclosure of which is incorporated herein by reference thereto.

FIELD OF THE INVENTION

The present invention relates to an improved method of accomplishing the method of the previously filed parent application using a non-air polluting solvent. More particularly, the present process relates to a method by which a paving grade asphalt material, having a penetration of from 40 to 300 at 77° F., may be reduced to a penetration of below 25 without sacrificing other significant properties, i.e., ductility and resiliency, of the asphaltic material. This invention discloses the blending of a paving grade asphalt with a very hard, high softening point, solvent extracted resin asphaltene residuum. This blend is further diluted with a non-evaporative solvent to obtain a product suitable for application to absorptive granular materials for the stabilization thereof.

BACKGROUND OF THE INVENTION

On Nov. 9, 1965, U.S. Pat. No. 3,216,336 was granted to J. R. Benson on "ASPHALT PENETRATIVE GROUND STABILIZER", hereinafter referred to as "Benson Patent". The invention related to a process of soil stabilization by the use of an asphaltic binder mixture. The mixture made use of a selected, single, hard asphalt resulting from the then currently used propane extraction process in oil refining. However, shortly after the issuance of the patent, the sources of suitable hard asphaltic material were discovered to be somewhat limited. The more suitable asphaltic materials were also discovered to be useful in improving the quality of regular paving asphalt for which there was a greater commercial demand. As a result, the Benson patent never obtained wide general acceptance in the United States.

Adding to the obstacles limiting the success of the Benson patent were the crude oil shortages of the early 1970's. These shortages served to further limit the supply of suitable asphaltic products for use in the patented process. As a result of the shortages, oil refiners developed new refining methods which extracted a maximum amount of energy products and lubricating oils from a given quantity crude oil. In fact, many oil refineries in the United States stopped producing not only soft normal asphalts (having penetrations of 40 to 300) but also stopped producing the low penetration asphalt (3 to 25 penetration) required for use in the Benson patented process.

The new more efficient refining methods produced only a dry, powderous, extremely hard, residue very different from the original hard asphaltic product contemplated for use in the Benson patent. Eventually, the use of the Benson patented process and associated materials (marketed under the trademark "Peneprime") diminished to the point of non-use and relinquishment of the associated trademark.

An important part of the Benson patent related to the character of the hard base asphalt. Previous attempts to utilize hard asphaltic base materials were unsuccessful due to the brittleness of the treated surfaces. Rapid break-up and ravelling of the treated surfaces occurred under exposed traffic. The asphalts produced in these previous trials were usually air-blown asphalts where the consistency had been altered by reducing a soft asphalt in penetration by heating and blowing with air. While the treatment succeeded in obtaining a hard asphalt, the resulting product had a high softening point and very low normal ductilities. Benson discovered, however, that when soft asphalts and distillation residuals were hardened by a propane extraction process, the asphalts so produced not only had the desired penetration (in the 3 to 25 range) but also had low softening points and good ductilities. As a result, these materials could be successfully combined into a penetrative binder which had good stabilizing characteristics, i.e., both penetrates into the absorptive soil and has a low penetration cured residue, with excellent resiliency in use.

Prior to discontinuing the use of the Benson process, a number of schemes were improvised so as to produce a satisfactory base asphalt to meet the requirements of the Benson process. However, the cost associated with these improvisations could not be justified owing to the low commercial value of the resultant product. It became apparent that in order to obtain an asphaltic material equal to the propane extracted asphalts generally used under Benson's patent, a simple process utilizing locally and immediately available normal paving grade asphalts had to be developed. Further, it was essential that such asphalts be economically reduced to penetrations below 25 while retaining high ductilities and low softening points. Finally, in order to make the process commercially viable, all of the necessary components and equipment to produce the binder product had to be readily and economically available in all parts of the United States in a cost efficient and simple manner.

During recent years, new and even more efficient oil refinery processes have been developed. These processes have been found to produce a very hard, high softening point, residuum in the form of a flaky powder. The penetration of this residuum is 0 at 77° F., and generally has a softening point above 200° F. In some instances, due to these and other undesirable characteristics, including the incorporation of such materials as ash and various metals, the residuum is frequently considered unacceptable for blending into normal paving grade asphalts and is discarded as a "waste" product. At times, the residuum even has a negative market value since it must be disposed of in some manner.

It was the discovery of the parent application referenced herein above that such resin-asphaltene residuums could be proportioned and blended with normal paving grade asphalts (having a penetration in the range of 40–300) so as to produce a base asphaltic material useful in the Benson process. The blend of paving grade asphalt and residuum exhibited good ductility and softening points, these characteristics being the key elements regarding the suitability of the blend for the stabilization of absorptive materials.

Whereas only propane extracted asphalt or similar products were usable under the Benson patent, the parent application composite product, which uses a minor part of such residuum and a major part of normal paving grade asphalt, results in a suitable product for all of the purposes set forth in the Benson patent. The usual proportions of residuum and diluent are at less than ⅓ residuum and more than ⅔ normal paving grade asphalt. Since the paving grade asphalts are universally available throughout the United States, it became possible to use the residuums in combination with the paving asphalts to economically produce an asphaltic product for use in the stabilization of highway and road building surfaces comprised of absorptive materials. In this manner, stabilized roadway surfaces could usually be produced at one half the cost or less as compared with the preparation of a similar surface using only normal paving grade asphalts. In addition, the new material could be produced without expensive and complicated refining equipment.

The preparation of the blend involved only the use of low cost equipment and the operational skills of personnel having very limited technical training. The blending process comprised essentially heating the paving grade asphalt to a temperature in the range of 300° F. and proportioning the paving asphalt with residuum (either by injecting or adding molten or dry residuum) until the penetration of the resultant blend was below 25. The resultant product of paving asphalt and residuum is then blended with a solvent (contemplated in the parent application as being a naphtha-kerosene solvent) and used in the Benson stabilization process.

During research conducted subsequent to the filing date of the parent application, it was found that the use of a naphtha-kerosene solvent did not always result in an ideal binder for use in the Benson process. That is, the asphalt from the various refineries varied sufficiently in composition such that the amount of solvent required to achieve a penetrative binder suitable for use in the Benson process varied greatly. Also, it was found that the heavier fractions contained in the solvent impaired the curing rate of the resultant residue and also raised the penetration thereof after curing. Further, the naphtha-kerosene solvent, or the equivalent thereof described in the parent application, was designed so as to evaporate into the air, which created air pollution and increased the viscosity of the binder product during application.

The solvent chosen for use in the parent application was substantially derived from solvents used in the preparation and use of other presently available asphaltic binder products. The nearest comparable binder products used in stabilization processes are "cut back asphalts" wherein the solvents (diluents) used in the products are specifically designed to evaporate into the air. Similar evaporative solvents are used in both "cut back asphalts (rapid curing)" and "cut back asphalts (medium curing)". Since the parent application contemplated the use of similarly derived solvent diluents, a natural consequence was the evaporation of the solvents into the air.

Following the discoveries that the refinery residuums were more sensitive to evaporative solvents than previously anticipated, and that air pollution problems were associated with the evaporative solvents, research was performed so as to address these issues. The discoveries made during research to determine a superior solvent diluent for use with the residuum paving asphalt blend are as set forth below:

a. The proposed solvent must be devoid of rapidly evaporating constituents that cause air pollution and increase the viscosity of the product upon evaporation.

b. In order to obtain the maximum absorption depth into the surface of the absorptive granular material as rapidly as possible, the solvent diluted binder product must be absorbed into the surface before substantial dissipation of the solvent occurs.

c. The rapid loss of solvent, by evaporation, during the application and absorption process of the binder, not only causes air pollution but raises the viscosity of the binder product and thereby reduces the absorptive characteristics of the binder product into the absorptive surface.

d. Heavy fractions of the solvent soften the asphaltene resin residuums by raising their penetration, thereby reducing the stability of the final stabilized surface.

To solve the above listed objectives, it was necessary:

a. That the solvent be in a distillation range that eliminated the rapidly evaporating fractions thereof.

b. That the solvent should also have the heavy fractions thereof eliminated, which heavy fractions might unduly soften the cured and absorbed binder material in the treated surface.

(This second factor being recognized owing to the fact that in order to obtain the desired stability of the treated surface, the residue remaining in the absorptive soil should desirably have a penetration below 25.)

During research to discover an improved solvent, the original "naphtha-kerosene" solvent was evaluated as a baseline. It was determined that a combination of naphtha and kerosene (meeting the requirements of ASTM D-86) created an approximate distillation range of the solvent from an Initial Boiling Point (IBP) of 225° F. to an End Point (EP) of approximately 580° F. It was further found that a major part of the solvent had a distillation range of below approximately 300° F. As a result of this low distillation range characteristic a substantial portion of the solvent would be lost during the application and absorption processes owing to evaporation. This evaporation would not only result in significant air pollution but also result in an increase in the viscosity of the binder product which would seriously inhibit the ability of the binder product to be absorbed into the surface of the absorptive granular material.

The research also determined that the portion of the naphtha-kerosene solvent which had a distillation temperature in excess of 425° F. would result in the softening of the paving asphalt and residuum binder product to the extent that the residue of the binder product remaining in the soil would have a penetration above 25. This increased penetration would result in a decrease in the capacity of the residue to stabilize the absorptive surface and would also prolong the curing process of the applied binder.

The next solvent to be examined was the solvent used to produce cutback asphalt, specifically a solvent meeting the requirements of ASTM-D-2028-76 and 81. This standard permits an EP of the distillation range at above 600° F. Also, as much as 50% of the solvent had a distillation range in excess of 437° F. As a result of this substantial heavy fraction, the resulting binder product had a penetration in excess of 25 thereby defeating the stabilizing and curing aspects of the binder product.

It was found that the solvents used to produce cutback asphalts, medium curing, were also deficient. The ASTM specification (ASTM-D-2027-76 and 81) again permitted an EP of above 600° F. Again, such a solvent did not meet the objectives of the required solvent for the reasons set forth above with regard to the cut back asphalt (rapid curing).

The next solvent examined was JP-4 and JP-5 jet fuel (MTL-T-5624L). Benson had used these solvents in several processes and had determined that the IPB was below 130° F. and the EP could be as low as 320° F. These solvents were both determined to be unsatisfactory for use with the present binder because a major part thereof would be lost during the application and absorption phases of applying the binder. This loss resulted in both air pollution and a significantly increased viscosity.

Diesel fuel number 1 (ASTM D-975) and number 1 fuel oil (ASTD D-396) were also examined for their suitability as a solvent, and were discarded for reasons similar to those for the jet fuel.

Failing to obtain a suitable solvent among the solvents generally used with asphaltic products led to the experimentation with solvents used in paint production. These solvents are commonly referred to as mineral spirits or Stoddard solvent (ASTM-D-235-83). The distillation range permitted under such specifications has an IPB of 300° F. and an EP of 412° F. It was discovered that a solvent within this distillation range was acceptable to meet the objectives of both limited evaporation and non-residuum softening heavy fractions. Ideally, the distillation range of these solvents can be lowered to an IPB of approximately 285° F. and the EP can be increased to approximately 425° F.

Using the mineral spirit solvents, the blend of asphaltene-resin residuum and paving asphalt described in the parent application referenced above, resulted in a penetrative binder product having the following properties:

1. A product which would be rapidly absorbed into an absorptive surface, usually within a very few minutes and at least within one hour.
2. Due to the IBP of approximately 300° F., essentially no vaporization of the solvent could take place during application and absorption. These characteristics thereby eliminating the air pollution and detrimental increases in viscosity associated with distillation range having a low IPB.
3. The rapid absorption of the product into the surface prevented extended exposure to the air; thereby minimizing evaporation.
4. That by rapid absorption of the product into the surface, the product suffered a minimum, if any, change in viscosity during the absorption, while the cured penetration was not affected.
5. Due to the rapid penetration of the product into the surface, no aeration was necessary as the solvent was rapidly adsorbed on the surfaces and into the pores of the absorptive soil or aggregate.

It was also discovered that a large part of the non-evaporative solvent in either a liquid or vapor phase would be selectively adsorbed onto the surfaces of underlying substrate soil particles with further absorption into the interstitial and capillary pore spaces existing below the upper stabilized substrate. As a result, the asphaltic binder blend of residuum and asphalt would be deposited and left in place in the treated material to the depth to which it originally penetrated, while the diluent continued to migrate into the substrate. This adsorbed/absorbed phenomena was accelerated, in some cases, by changing barometric pressures.

The adsorption/absorption phenomena of solvent being drawn into the underlying layers of treated substrate acted to decrease the movement of destabilizing water into and through the material strata. The penetrating and adsorbed/absorbed solvent is theorized as leaving oily film in the pore channels of the substrate soil thereby preventing the capillary rise of moisture, which, in turn, inhibited the subsequent wetting of substrate particles by water. The net result is a further increase in the stability of the treated substrate owing to the decreased capacity of water to enter the treated portions thereof. The ultimate oxidation of the oily films did not decrease the inhibiting effects of the original films. Also, since the majority of the non-evaporative solvent remains in an adsorbed or absorbed condition, air pollution due to diluent evaporation is minimized or entirely eliminated.

The end product of the present invention is a blend of normal paving grade asphalt and residuum, diluted with a non-evaporative solvent in sufficient proportion to make a fluid blend at ambient temperature. This fluid blend penetrates extremely well into earthen or slightly porous highway, road or other surfaces. The resultant surface then cures into a hard, resilient surface as described in the Benson patent.

The process of blending the composite asphaltic binder as described up above, results in an improved binder as compared with the binder product described and claimed in the parent application. The improved binder product includes all of the desirable stabilizing characteristics of the parent application binder but eliminates the pollution, viscosity increasing, slow curing, and poor stability disadvantages thereof.

The advantages of the present and parent application blends continue to be that whereas normal paving grade asphalts have a substantial percentage of oily constituents, including malthenes, the resin asphaltene residuum is essentially an asphalt residue from which nearly all of the resins and much of the oily constituents have been extracted. The remaining material consists of a micelle, comprising a carbonaceous core encompassed in a hard resinous material. The micellian structure of the original asphalt is thereby retained.

Electrical resistivity tests indicate that there is retention of the resinous material described above since the residuum exhibits an extremely high resistance while the carbonaceous core material in the center of the micelle is more or less electrically conductive. It is this fact that accounts for the ability of the residue to disperse and dissolve in the basic asphalt. By blending these products in the disclosed proportions, the resultant mixture has a larger percentage of asphaltenes and hence a greater cementing and load-bearing capacity than normal paving grade asphalts without the residuum blend. Such characteristics provide longer life roadway surfaces with a greater resistance to weathering.

The unexpected results and advantages of blending composite asphalts from residuums and normal paving grade asphalts according to both the parent and presently improved non-evaporative solvent invention are as follows:

1. The resin asphaltene residuum is soluble in and easily dispersed into regular paving asphalts.
2. The blend is compatible, with no significant separation of any constituents.
3. Penetration of less than 25 can be obtained with a wide variety of sources of both residuum and paving grade asphalts.
4. The composite of residuum and paving grade asphalts results in a product having appreciable ductility.

5. The composite blend is diluted with a non-evaporative solvent without precipitation of asphaltenes.
6. The composite asphalt, when diluted with a non-evaporative solvent, readily penetrates absorptive surfaces to depths equal to or greater than the diluted propane extracted asphalt as covered by the Benson patent.
7. The improved non-evaporative solvent binder product results in less softening of the blend of asphalt and residuum after curing, and also results in improved penetration into the absorptive surface owing to the non-evaporation of this solvent during application.
8. The treated absorptive granular material hardens and cures into a surface suitable for traffic with good durability (due to the high ductility of the binder), and has weathering characteristics superior to previously used propane extracted asphalts.
9. The resin asphaltene residuum can be moderately diluted with non-evaporative solvent and shipped to distant locations, thereafter being blended into desired products of desired viscosity
10. The residuum can also be shipped in containers similar to conventional shipment of roofing asphalts. It can then be melted, blended into a composite and further blended with the non-evaporative solvent to the required viscosity.

SUMMARY OF THE INVENTION

In the present invention, a process has been discovered which produces a material with desireable properties for use as a absorptive surface penetrative binder. Wide availability of asphaltic residuums from oil refining processes, and locally available paving grade asphalts, further blended with a non-evaporative solvent, now permits the creation of penetrative binder which maintains the low penetration and ductility of the base asphalt and residuum blend while also maintaining the low viscosity of the binder during application for superior penetration into the treated surface and eliminating air pollution.

Other objects, features, and characteristics of the present invention, as well as the methods and operation and functions of the related elements, will become apparent upon consideration of the following description and the appended claims, all of which form a part of this specification.

DETAILED DESCRIPTION OF THE PREFERRED EMBODIMENT

As used herein, the following test methods and terms shall be applicable:

1. The term "PENETRATION" as used herein, in relation to the hardness of asphaltic material, shall be determined by ASTM Standard Designation D5-83, 100 g, 77° F., 5 seconds. However, this designation shall not be applicable to the term "PENETRATION" and "PENETRATIVE" when used in relation to the depth of penetration of a liquid into a surface.
2. DUCTILITY shall be determined by ASTM Standard Designation D 113-79.
3. SOFTENING POINT shall be determined by ASTM Standard Designation D-36-86 (Ring and Ball Method).
4. BENSON PATENT shall refer to U.S. Pat. No. 3,216,336 granted to J. R. Benson on Nov. 9, 1965, for "ASPHALT PENETRATIVE STABILIZER".

5. RESIDUUM shall refer to resin asphaltene solvent extracted residue from modern day oil refining processes, and shall describe a material having a penetration of zero to a minimum of approximately 120° F. and a softening point exceeding approximately 200° F.
6. STABILIZATION and STABILIZING is the act of making a surface or body resistant to water, wind and wear effects.

Published information as to the character of the solvent extracted residuum produced by modern day oil refining methods, indicates that the residuum contains various amounts of sulfur, minerals and metals, depending on the crude oil source and refinery operating criteria. The product is very hard and brittle and may be powdery, flaky or chunky. This residuum normally would be very low in oily constituents (only very heavy ends) and low in resin content. The highly carbonaceous asphaltene (petroleum ether insoluble) portion of the residuum is normally very high. The total hydrogen content is low. An analysis of a typical residuum is as follows:

| | |
|---|---|
| Softening Point | 270–310° F. |
| Molecular Weight | 3200 |
| Carbenes | 0.54% |
| Asphaltenes | 68.2% |
| Resins | 5.6% |
| Oily Constituents | 26.7% |
| Mineral Matter | .57% |
| Total Carbon | 84% |
| Hydrogen | 8.5% |
| Flashpoint | 635° F. |
| Penetration at 135° F. | 0 |
| Penetration at 150° F. | 5 |

At ambient temperature such residuums can be crushed into powder or be liquified at normal temperatures of 300°–400° F. (at softening points of 270°–310° F., liquification must be well above 300° F.). Although the residuums are high in sulphur and contain contaminants, these contaminants do not prohibit use of such material in combination with normal paving grade asphalts to obtain a satisfactory minus 25 penetration base stock. In use, as a penetrative binder, all of the contaminants contained in the residuum and asphalt blend are closely bound in the composite hardened asphalt and thus present no adverse effects.

The blending process involves simply heating the paving grade asphalt to a temperature above 300° F., adding residuum, in either a dry solid state or a molten state, and agitating or mixing until the blend penetration is below 25. The blend of residuum and asphalt is then further diluted with a non-evaporative solvent (to a Saybolt Furol viscosity at 122° F. of less than 100 seconds) for application to highway or soil surfaces as a penetrative binder.

The equipment requirements for this blend have been previously noted and would only require such tanks, pumps, and heating equipment as may be easily portable for field and site applications. The residuum may be shipped in a molten condition at temperatures of approximately 400° F. (in insulated tank cars or trucks) in which state it may be blended with heated liquid asphalt, (shipped hot or heated by conventional retort circulating asphalt heaters), then either tank or pipe blended with a non-evaporative solvent.

The residuum may also be partially blended with sufficient solvent of the described type to make the material sufficiently fluid at temperatures below the 400° F. temperature required for the raw residuum, so as to make shipping and blending easier at the point of application.

Three asphaltic residuum products have been determined to be suitable for use in the preparation of penetrative binder according to the present invention. The first residuum comprises asphaltenes and resins and has a softening point of 250° F.+This residuum can be produced by the residuum oil super critical extraction process.

A second residuum product suitable for use in the binder of the present invention involves the abovementioned residuum blended with catalytic refining slurry oil. The residuum and slurry oil are blended to provide a penetration of 1 to 5. This blended product can be shipped over long distances by tank cars, unloaded at the destinations with the aid of steam or oil heat, and there blended into the penetrating binder product. This residuum blend is acceptable for preparation for the binder product but does not provide as deep a penetration into absorptive surfaces or cure as rapidly as the above-mentioned preferred super critical extracted residuum product.

The third alternative residuum product for use in preparation of the present invention is a propane extracted residuum. This residuum is only useful if extracted to yield a penetration of less than 3. Although this residuum is less desirable than the two previous residuums mentioned above, in the absence of such residuums at an acceptable delivered cost, propane extracted residuums can be substituted therefor. The propane extracted residuum will not penetrate as rapidly or cure as rapidly, but can still be used if deemed to be the most cost efficient.

The residuum is blended with normal paving grade asphalts meeting the requirements of ASTM standard specification D 946-82, preferably 85-100 penetration grade. A substitute for these penetration graded asphalt cements can be a viscosity graded AC-10 (ASTM D 3381-83 standard specification), having the same physical characteristics. The addition of the asphaltic cement contributes ductility and longer life to the finally produced penetrative binder product.

The asphalt cement is blended with the residuum until a penetration of the blend is obtained to be between 15 and 25. Preferably, the penetration should be as near 20 as possible. It is very important that the combination of residuum and asphalt cement represents a solution and not a mixture, this blending can usually be accomplished at temperatures between 300°-350° F. This is important, because a complete blending is necessary instead of a mixture, to provide longer life in use.

The sequence of combination of the residuum, asphalt cement, and non-evaporative solvent can be accomplished in any convenient sequence. Any two of the three components can be combined according to routine experimentation which has been performed to determine the ideal combination of the respective constituents for a given residuum product. If the asphalt cement and solvent are first blended, a very liquid material is produced which can easily be blended with any of the residuum products. This sequence of combination results in an easier and more rapid blending and eliminates the possibilities of obtaining mixtures instead of blends as mentioned above.

To aid the blending process, one or more agitators, as required, are provided so as to thoroughly agitate the blending tank. These agitators should be in operation while the blending operation is being performed.

The preferred solvent for use in creating a penetrative binder according to the present invention has an initial boiling point (IBP) of approximately 300° F. and an end point (EP) of approximately 400° F. Mineral spirits and Stoddard Solvent (ASTM standard specification D235-83) meet this requirement. (Notably, none of the other test results associated with the ASTM D-235 standard specification, except distillation, are important with regard to determining whether a solvent can be used). However, any petroleum naphtha with an IBP of not less than 285° and an EP of not more than 425° may be used. This distillation range eliminates the very evaporative parts of the petroleum distillate that can be lost both during the blending of penetrative binder product and later during application of the product to absorptive surfaces. The evaporative parts of a solvent will evaporate from the blend and cause air pollution and increase the viscosity of the penetrating binder, thereby reducing its absorption into the treated surface.

If the solvent has a substantial part having an EP which exceeds 425°, this part will cause excessive softening of the cured binder. Excessive softening of the cured binder leads to a lack of stability, resiliency, and durability in the finally treated surface.

The results of the above combinations of residuum, asphaltic cement, and non-evaporative solvent yield a residue which preferably has a penetration in the range of 12 to 25. Residue from the distillation of the three component binder product shall not be less than 55% by volume distilled. Furol viscosity at 122° F. shall be less than 100 seconds. (ASTM-D88-81). It should be noted that during colder seasons and with a tight and low porosity absorptive surface, the viscosity should be in the lower part of the viscosity range and during hot weather and with high porosity surfaces, the viscosity may be in the higher part of the range.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of producing a penetrative binder for use in stabilizing an absorptive granular material, comprising the steps of:

blending a paving grade asphalt having a penetration at 77° of between 40 and 300 with a solvent extracted resin asphaltene residuum having a penetration of zero at a minimum temperature of approximately 120° F., in sufficient proportion so as to reduce the penetration of the resultant blend to less than 25;

combining the blend of paving asphalt and residuum with a non-evaporative solvent, said non-evaporative solvent having a distillation range having an initial boiling point of approximately 285° F. and an end point of approximately 425° F., the resultant blend of paving asphalt, residuum, and solvent having a saybolt furol viscosity at 122° F. of less than 100 seconds.

2. A method according to claim 1, further comprising:

heating said paving grade asphalt to a temperature above 300° F., proportioning, blending, mixing and adding said residuum in a molten state.

3. A method according to claim 1, further comprising:
heating said paving grade asphalt to a temperature above 300° F., proportioning, blending, and adding said residuum in a dry state.

4. A method according to claim 1, wherein:
said proportion of residuum to paving grade asphalt is in the range of 10-45% to 90-55%.

5. A method according to claim 1, wherein:
said proportion of residuum to paving grade asphalt is approximately ⅓ to ⅔.

6. A method according to claim 1, wherein:
said proportion of residuum to paving asphalt is approximately ¼ to ¾.

7. A method according to claim 1, wherein:
said blend of residuum and paving grade asphalt has a penetration of between 15 and 25.

8. A method of producing a penetrative binder for use in stabilizing an absorptive granular material, comprising the steps of:
blending a paving grade asphalt having a penetration at 77° of between 40 and 300 with a solvent extracted resin asphaltene residuum having a penetration of zero at a minimum temperature of approximately 120° F., in sufficient proportion so as to reduce the penetration of the resultant blend to less than 25;
combining the blend of paving asphalt and residuum with a non-evaporative solvent, said non-evaporative solvent having a distillation range having an initial boiling point of approximately 285° F. and an end point of approximately 425° F., the resultant blend of paving asphalt, residuum, and solvent having a viscosity sufficient to permit shipping of the residuum, paving asphalt, and solvent blend in tank cars to destinations where the blend can be unloaded;
further blending the blend of paving asphalt, residuum, and solvent with additional solvent until the resultant blend of paving asphalt, residuum, and solvent has a saybolt furol viscosity at 122° F. of less than 100 seconds.

9. A method of making a stable surface out of an absorptive granular material, comprising the steps of:
blending a paving grade asphalt having a penetration at 77° of between 40 and 300 with a solvent extracted resin asphaltene residuum having a penetration of zero at a minimum temperature of approximately 120° F., in sufficient proportion so as to reduce the penetration of the resultant blend to less than 25;
blending the blend of paving asphalt and residuum with a non-evaporative solvent, said non-evaporative solvent having a distillation range having an initial boiling point of approximately 285° F. and an end point of approximately 425° F., the resultant blend of paving asphalt, residuum, and solvent having a saybolt furol viscosity at 122° F. of less than 100 seconds;
spreading the blend of residuum, paving grade asphalt, and non-evaporative solvent over said absorptive material; and
allowing substantially all of said non-evaporative solvent to be adsorbed, absorbed, or otherwise further dissipated into the absorptive substrate material so that only a residue of the residuum and paving grade asphalt blend is retained in the originally penetrated surface so as to form a stable surface.

10. A method according to claim 9, wherein:
said proportion of residuum to paving grade asphalt is in the range of 10-45% to 90-55%.

11. A method according to claim 10, wherein:
said proportion of residuum to paving grade asphalt is approximately ⅓ to ⅔.

12. A method according to claim 10, wherein:
said proportion of residuum to paving asphalt is approximately ¼ to ¾.

13. A method according to claim 10, wherein:
said blend of residuum and paving grade asphalt has a penetration of between 15 and 25.

14. A method of stabilizing absorptive granular material, comprising the steps of:
spreading a fluidic binder on an upper surface of said absorptive material, said binder comprising a combination of asphaltic products and solvent and penetrating into said absorptive granular material to an original penetration depth; wherein,
said solvent is non-evaporative and capable of being adsorbed and absorbed into the underlying layers of the absorptive granular material existing below said original penetration depth, said solvent moving in both liquid and vapor form into the capillary and pore spaces of said underlying layers so as to inhibit the wetting of particles in said underlying layers and the movement of water into and through the pore channels and spaces of such underlying layers.

15. A method as in claim 14, wherein:
said non-evaporative solvent has a distillation range having an initial boiling point of approximately 285° F. and an end point of approximately 425° F.

* * * * *